UNITED STATES PATENT OFFICE.

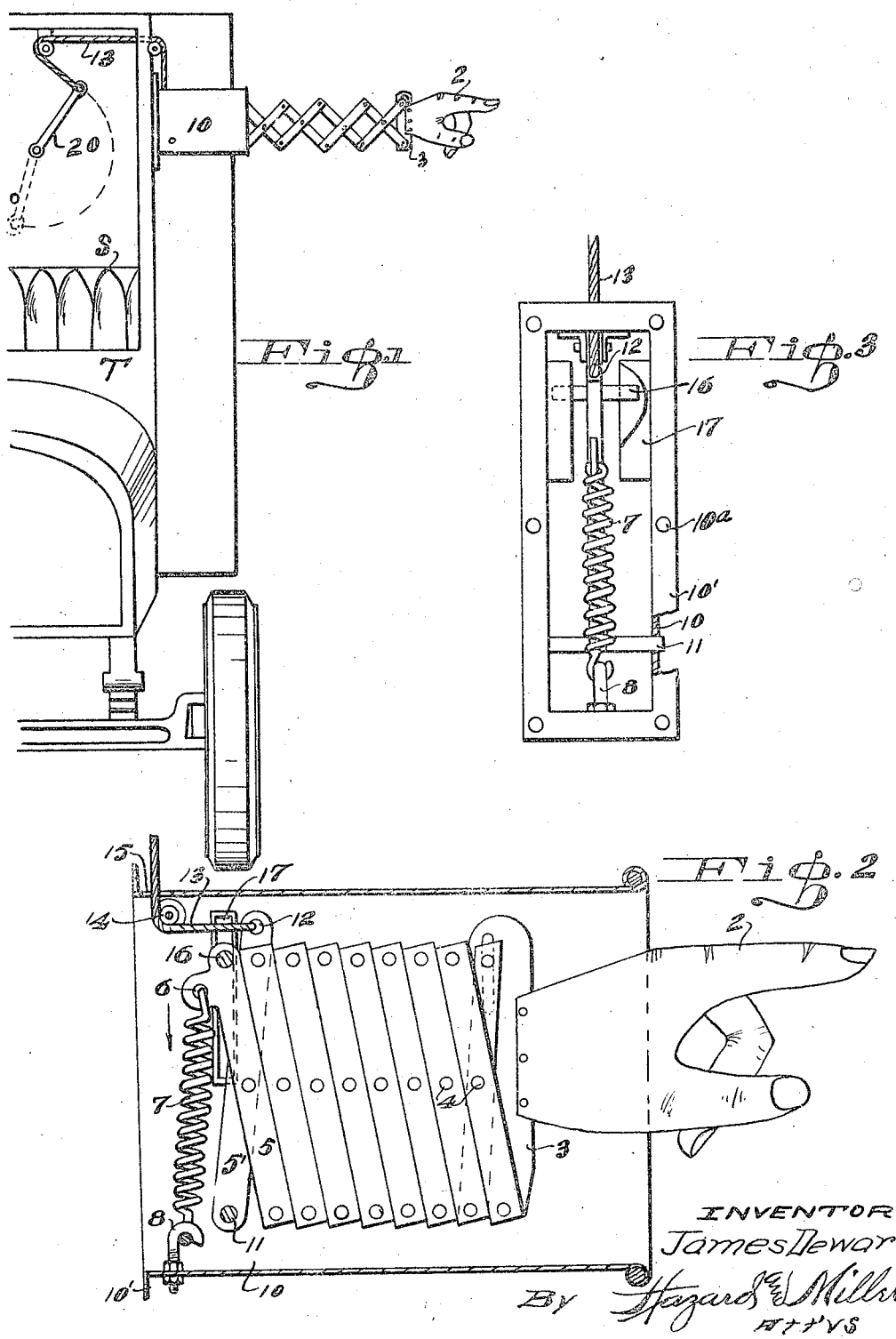

JAMES DEWAR, OF LOS ANGELES, CALIFORNIA.

AUTO DIRECTION-SIGNAL.

1,380,546.   Specification of Letters Patent.   Patented June 7, 1921.

Application filed March 16, 1920. Serial No. 366,331.

*To all whom it may concern:*

Be it known that I, JAMES DEWAR, a citizen of the United States, residing at Los Angeles, in the county of Los Angeles and State of California, have invented new and useful Improvements in Auto Direction-Signals, of which the following is a specification.

This invention relates to direction indicators for road vehicles and has for its object to provide an inexpensive, simple, an effective, and easily operable semaphore that can be attached to a convenient portion of a vehicle and particularly to motor trucks from which it is difficult to give the usual arm signal when making turns or when intending to stop. The invention consists of the construction, the combination, and in details and arrangements of the parts, an embodiment of which invention is illustrated in the accompanying drawings.

Figure 1 is a front end view of the portion of a motor vehicle to which the signal is applied and in extended position.

Fig. 2 is a central, vertical, sectional view through the casing of the semaphore the latter being retracted to non-signaling position.

Fig. 3 is an end view showing the operating mechanism.

The improved signal comprises a hand-shaped sign member 2 attached to the front or end member 3 of a lazy-tong device the levers of which are pivoted at their outer ends in alternate relation and which are pivoted centrally as at 4. One of the rear levers as 5 is attached at one end at 6 to end of a contractile spring 7 at opposite end of which is connected to hook 8 adjustably mounted in the bottom portion of a frame or box 10 that preferably is of just sufficient width, thickness, and length to substantially inclose the contracted semaphore as shown in Fig. 2.

The companion rear link 5' is mounted on a fixed pivot 11 extending across a box 10 and its upper end is attached at 12 to an operating device as a piece of wire cable 13 that may pass around the guide pulley 14 in the box and then out through an opening 15 to be extended to a convenient portion with respect to the driver's seat S of a motor vehicle or truck T on a suitable portion of which the box 10 may be attached. At one end the box has a flange 10' to receive fastening device passing through holes 10ᵃ in the flange 10'.

The upper end of the link 5 is provided with a cross-pin 16 slidably guided for vertical movement in guide-ways 17 provided on the inner surface of the adjacent walls of the box. Normally the spring 7 tends to project the signal hand 2 by pulling the guided upper end of the link or lever 5 downwardly thus tilting the lever 5' outwardly on its pivot 11 at which time the cable 13 is drawn inwardly by the outward movement of its connection 12 with the lever 5'. The signal member 2 is retracted by the lazy-tongs into the box 10 by the pulling of the cable 13 by the driver of the vehicle which causes the contraction of the levers of the lazy-tongs. The signal can be maintained in the retracted position by attaching the end of the cable 13, adjacent to the driver's seat to any suitable restraining device as a lever or hook 20.

From the above it will be seen that the device is not only simple and very effective in the display of the desired signal but also it is of light weight by compact construction and organization and may be readily attached to any convenient and desired part of the vehicle and operated from the remote point.

Various changes may be made without departing from the spirit of my invention as claimed.

What is claimed is:

1. A signal device attachable to a road vehicle and comprising a box, a series of lazy-tong levers arranged within the box, one end of one of the levers at the inner end of the series of levers being pivoted to the box, the opposite end of the companion lever being slidably connected to the box so as to move toward and away from the said pivot; a spring for normally actuating the lazy-tong levers to an extended position; a signal member on the outer end of the series of lazy-tongs; and a manually operable device restraining the actuation of said lazy-tongs by said spring.

2. A traffic signal for vehicles comprising a support, a series of connected lazy-tong levers, a direction member carried by the outer end of said series of levers, one end of one of the levers at the inner end of the series being pivotally connected to the support, an operating member connected to the opposite end of the pivotally mounted lever, a retractile spring connected to the opposite end of the companion lever being guided in its movement toward and away from the fulcrum of the pivotally mounted lever.

3. A traffic signal for vehicles comprising a support, a series of connected lazy-tong levers, a signal member carried by the outer end of said series of levers, one end of the inner one of the series of levers being pivotally connected to the support, the opposite end of the inner one of the series of levers being retained for sliding movement in a direction substantially at right angles to the direction of backward and forward movement of the entire series of levers.

4. A traffic signal for vehicles comprising a support, a series of connected lazy-tong levers, a signal member carried by the outer end of said series of levers, one end of the inner one of the series of levers being pivotally connected to the support, and a retractile spring connected to the inner end of the series of lazy-tongs for distending the same.

5. A traffic signal for vehicles comprising a support, a series of connected lazy-tong levers, a signal member carried by the outer end of said series of levers, one end of the inner one of the series of levers being pivotally connected to the support, and manually operable means connected to the inner end of the series of lazy-tongs for folding the same against the power exerted by said spring.

6. A traffic signal for vehicles comprising a support, a series of lazy-tong levers, one end of one of the levers in the inner end of the series being pivotally mounted upon said support, a manually operable device connected to the other end of said pivoted lever, a retractile spring directly connected to one end of the companion lever at the inner end of the series, means for holding and guiding the movement of the lever to which the spring is connected, and a signal member carried by the outer end of the series of levers.

In testimony whereof I have signed my name to this specification.

JAMES DEWAR.